United States Patent [19]

Eckert

[11] Patent Number: 4,655,440

[45] Date of Patent: Apr. 7, 1987

[54] APPARATUS FOR CONTROLLING VEHICLE SPRING FIRMNESS

[75] Inventor: Konrad Eckert, Stuttgart, Fed. Rep. of Germany

[73] Assignee: Robert Bosch GmbH, Stuttgart, Fed. Rep. of Germany

[21] Appl. No.: 700,840

[22] Filed: Feb. 12, 1985

[30] Foreign Application Priority Data

Apr. 14, 1984 [DE] Fed. Rep. of Germany ....... 3414257

[51] Int. Cl.4 .................. F16F 5/00; B60G 11/26; B60G 17/04
[52] U.S. Cl. .................. 267/64.11; 188/299; 188/314; 267/64.16; 267/64.25; 280/707; 280/708; 280/714
[58] Field of Search ............... 267/64.11, 64.16, 64.17, 267/64.25, DIG. 1, DIG. 2, 167, 174, 179, 64.19, 11, 12, 13, 14; 188/299, 314, 316, 318; 280/708, 707, 6 H, DIG. 1, 714, 710

[56] References Cited

U.S. PATENT DOCUMENTS

| | | | |
|---|---|---|---|
| 2,995,382 | 8/1961 | Heitzman | 280/708 |
| 3,090,611 | 5/1963 | Schultze | 267/11 A |
| 3,101,220 | 8/1963 | Wettstein | 267/11 A X |
| 3,222,047 | 12/1965 | Tuczek | 267/64.25 X |
| 3,366,378 | 1/1968 | Sons, Jr. | 267/64.16 |
| 3,689,103 | 9/1972 | Meulendyk | 267/64.16 X |
| 3,736,000 | 5/1973 | Capgras | 267/64.16 X |
| 3,836,166 | 9/1974 | Bainbridge et al. | 267/64.16 X |
| 3,840,245 | 10/1974 | Aikawa et al. | 267/64.15 X |
| 3,871,635 | 3/1975 | Unruh et al. | 267/64.16 X |
| 4,091,897 | 5/1978 | Andrepont | 188/314 |
| 4,212,484 | 7/1980 | Fujii | 280/714 X |
| 4,216,977 | 8/1980 | Fujii | 280/714 X |
| 4,270,771 | 6/1981 | Fujii | 267/64.25 X |
| 4,333,668 | 6/1982 | Hendrickson et al. | 280/707 X |
| 4,478,431 | 10/1984 | Muller et al. | 280/714 X |
| 4,526,401 | 7/1985 | Kakizaki et al. | 188/299 X |
| 4,555,126 | 11/1985 | Ishimitsu et al. | 280/714 X |
| 4,589,675 | 5/1986 | Braun et al. | 280/714 X |

Primary Examiner—Douglas C. Butler
Attorney, Agent, or Firm—Edwin E. Greigg

[57] ABSTRACT

An apparatus for controlling the spring firmness of a road vehicle is proposed, which is combined with a control of the shock absorber firmness. Both controls are preformed using a single control valve. Trigger signals for the control valve are ascertained by an electronic device, which receives its signals from sensors, disposed on the vehicle, for spring travel, acceleration, vehicle speed and steering angle or the like, and in particular for a travel sensor which picks up the shock absorber compression and emits it as a signal to the electronic device, whereby changes in spring stiffness are achieved.

15 Claims, 3 Drawing Figures

APPARATUS FOR CONTROLLING VEHICLE SPRING FIRMNESS

BACKGROUND OF THE INVENTION

The invention is based on an apparatus for controlling the spring firmness of a motor vehicle, preferably a road vehicle. An apparatus of this kind is known (German Patent No. 16 30 058).

In this known apparatus, two work chambers of a shock absorber, or shock absorber leg, are connected via external lines to a device comprising a pump and two reservoirs. The only valves provided in the connecting lines to the shock absorber are one-way check valves. With an apparatus of this kind, however, the firmness of the shock absorber cannot be varied. To vary the spring firmness, energy must be supplied from outside, via the pump, which can only be accomplished relatively slowly and consumes power.

It is also known, from German Offenlegungsschrift No. 33 04 815, to vary the firmness of a shock absorber by using a separate control means.

In terms of spring and shock absorber firmness, the suspension of present-day vehicles, particularly passenger vehicles, is optimized for an average type of operation. The parameters are structurally fixed and remain unchanged during operation, except for the effects of aging. In extreme operating situations, such as with an empty or a fully loaded vehicle, such vehicles are far from optimally sprung; that is, the suspension is not optimally damped. These situations become still less optimal, the greater the ratio between the weights of an empty vehicle and the same vehicle carrying a maximum load.

A further consideration is that in order to save fuel and to use raw materials economically, the trend in designing new vehicles is increasingly toward a lightweight structure. Yet the usable load attainable will preferably not be reduced. In other words, in the future the above-mentioned weight ratio will become still greater, and it will be increasingly difficult to tune the spring firmness and the shock absorber firmness.

OBJECT AND SUMMARY OF THE INVENTION

The apparatus described at the outset above, has the advantage over the prior art that the spring firmness are continuously variable during vehicle operation, and can be tuned optimally and automatically to such peripheral conditions as loading, load distribution on the axles, vehicle speed, longitudinal acceleration (using the accelerator pedal or braking) and transverse acceleration (driving around curves) and uneven road surfaces.

A further advantage is that such an adaptive springing apparatus can function without any significant supply of external energy; that is, it functions passively and thus very rapidly, which is a prerequisite for instance in controlling the tendency to swerving while driving around curves.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
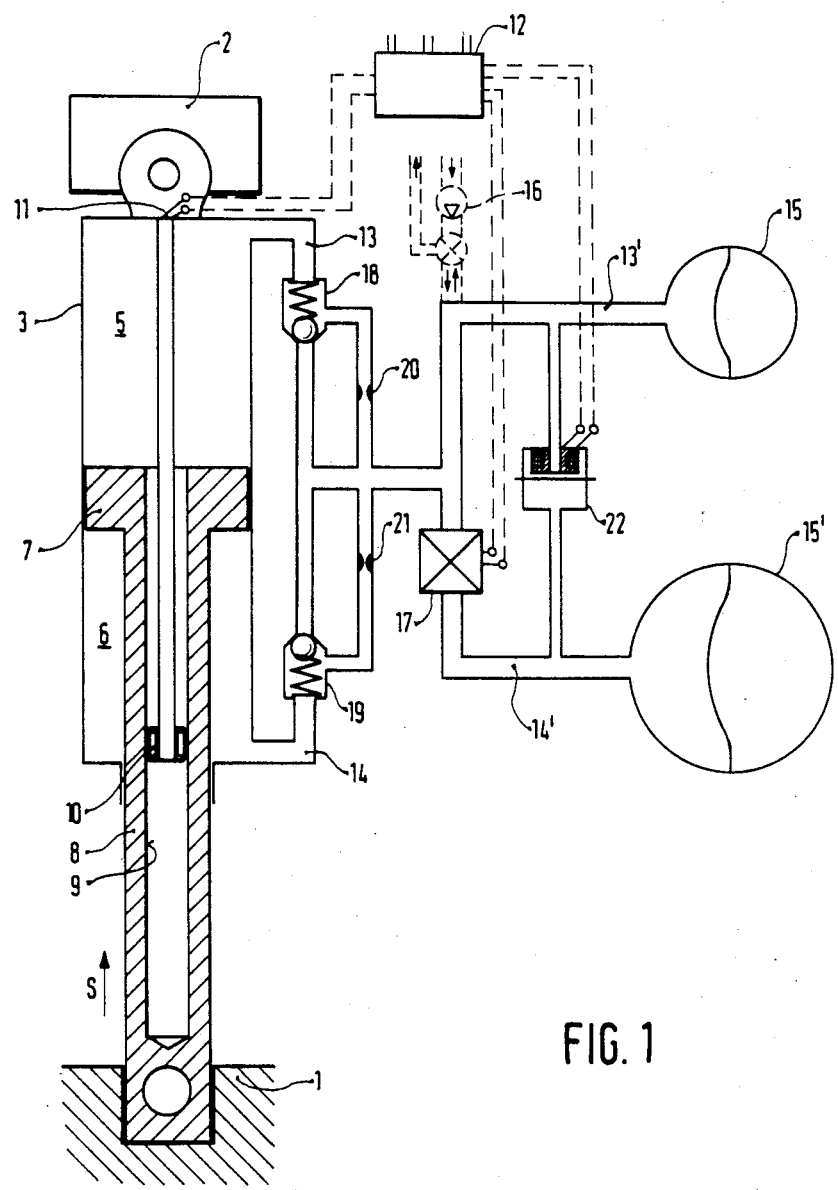
FIG. 1 shows an apparatus with a two-stage, variable stiffness.

Turning now to the drawings, an element 3 is disposed between a vehicle axle 1 and a vehicle body 2. The element 3 will be called herein a "shock absorber"; however, it has not only a shock absorbing but a load bearing function as well. The shock absorber 3 has two work chambers 5 and 6, divided by a piston 7. The piston 7 is supported by a piston rod 8, which is provided with a blind bore 9 from the top face side of the piston 7. A sensor 10 protrudes into this blind bore 9 and is capable of emitting a signal for the shock absorber compression stroke. Via a connection 11, the signal is emitted to an electronic device 12, which also receives sensor signals relating to acceleration, vehicle speed, steering angle and similar parameters.

Via lines 13, 14 and 13', the two work chambers 5 and 6 communicate with a hydropneumatic reservoir 15 and as needed with a pump 16. The pump 16 may be omitted, if a level control is dispensed with. By means of such communication with the reservoir, the shock absorber 3 becomes a hydropneumatic spring. A second reservoir 15' is connected to a line 14' communicating with the lines 13, 14 and 13' and can be switched on and off via a control valve 17 (a 2/2-way valve). The two work chambers 5 and 6 communicate with one another via two opposed check valves 18 and 19 and two throttles 20 and 21. The shock absorption effect of the shock absorber 3 is structurally variable, regardless of the adjustment of the control valve 17. Finally, a differential pressure sensor 22 is also inserted between the two reservoirs 15 and 15'.

Mode of Operation

The spring firmness and the shock absorber firmness are varied in accordance with various factors. These factors are detected by corresponding sensors and transmitted via sensor signals to the electronic device 12, in the same manner as the signal from the shock absorber sensor 10 is supplied to the electronic device 12. By the use of the pump 16, which does not need to have more than a small pumping volume, the volume in the work chamber 6 can be increased, or that in the work chamber 5 can be reduced, in order to vary the level of the vehicle body with respect to the axle. By the selection of the throttles 20 and 21, a desired asymmetry of the shock absorption, to any arbitrary extent, can be generated. In this manner, the tuning possibilities of the apparatus according to the invention are considerably increased.

However, the switching operation is performed with the control valve 17. By switching the second reservoir 15' into or out of action, the spring firmness is varied. Although the control valve 17 is capable of switching very rapidly, the demands made on it mechanically are very low.

It should also be noted that if needed, the throttles 20 and 21 may also be embodied as variable throttles.

For the level control [controlling level of vehicle body with respect to an axle], the position of rest at any arbitrary load status is ascertained and fed into the electronic system. This is accomplished by the integration of the travel S over a relatively long period of time T. The time T must be considerably longer than the period of a slow axle oscillation, because otherwise the high-frequency regulating processes and the superimposed process of ascertaining the average value interfere with one another. If this should cause a drift of the middle or average position, then it is also conceivable to ascertain the travel S at a specific load G each time before the vehicle is started, with the load at rest, and to store it in memory until the next time the vehicle is stopped.

The function of the electronic device 12, that is, the electronic regulating circuit, is sufficiently rapid in view of the axle oscillations likely to occur in actual operation.

With the aid of the sensor signals supplied to it, the controlling electronic system decides which of the two selectable spring firmnesses (only reservoir 15 or both reservoirs 15 and 15') better corresponds to the operating state and then triggers the control valve 17 accordingly.

EXAMPLES OF APPLICATIONS OF THE INVENTION

The variability of the overall characteristic, comprising the shock absorber firmness and the spring firmness, of the apparatus can be utilized in various ways:

1. Reduction of the spring firmness at low vehicle speed V (the guide variable is the velocity V).
2. Laterally symmetrical influence on the spring firmness in accordance with the measured transverse acceleration, or tendency to swerve, of the vehicle (roll regulation).
3. Influencing the front and rear axles in accordance with the vehicle deceleration or acceleration (pitch regulation).
4. Influence in accordance with the load status (level regulation).
5. Influence in accordance with the condition of the road or with the subjectively desired match between suspension and shock absorption, that is, whether a soft ride or a sportier, firmer ride is desired.

These points are ascertained by appropriate sensors and are supplied in the form of signals to the electronic device 12, which converts these signals into adjusting commands for the magnetic control of control valve 17.

Figure 2:
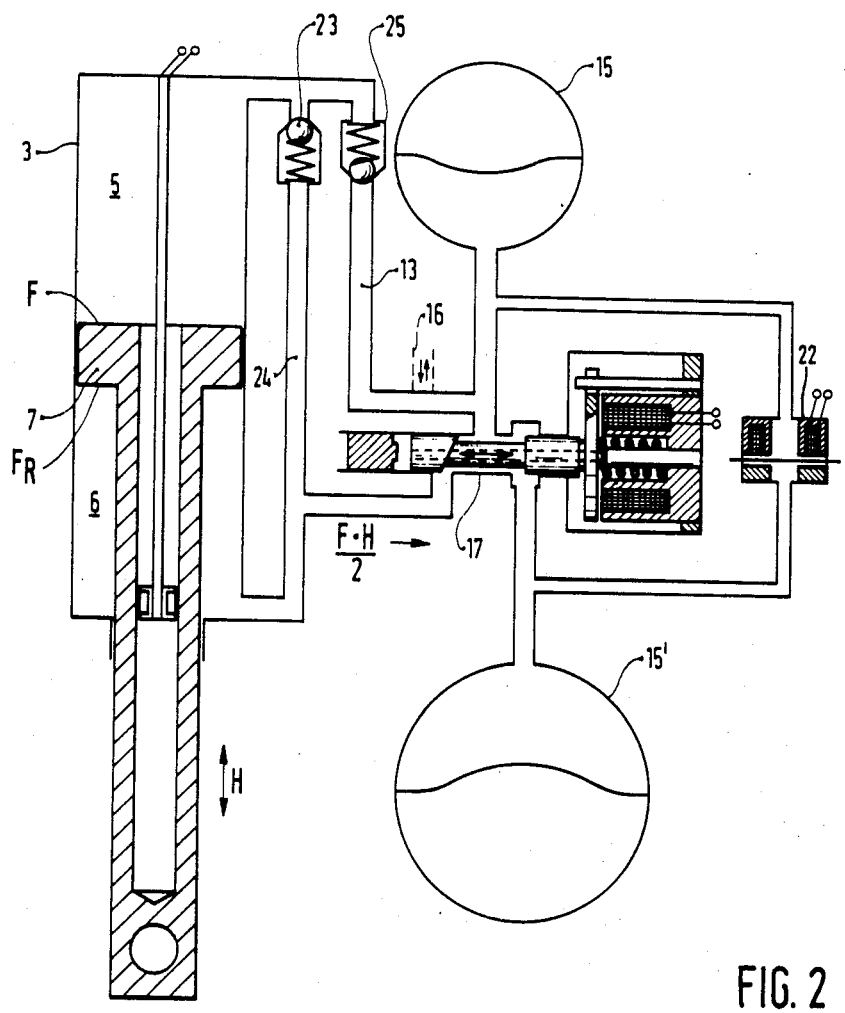
FIG. 2 is a further development of the structure of FIG. 1, having two selectable values for stiffness and damping values associated with each when there is a final control element.

FIG. 2 shows an apparatus similar to that of FIG. 1; corresponding elements are accordingly identified by the same reference numerals. The piston 7 of the shock absorber 3 is embodied such that an end face F is approximately twice as large in area as an annular surface $F_R$. The two shock absorber work chambers 5 and 6 communicate with one another via a check valve 23, which acts only in the direction of shock absorber compression and via a line 24. A second check valve 25 is located in a line 13 which leads to the first reservoir 15 and opens toward the upper work chamber 5 of the shock absorber 3. The control valve 17 here monitors a connection between the first reservoir 15 and the second reservoir 15', on the one hand, and the lower work chamber 6 of the shock absorber 3, on the otherhand. Finally, the two reservoirs 15 and 15' also communicate with one another via a differential pressure sensor 22.

A level control device having a pump 16 may be connected to the line 13.

Mode of Operation

When the shock absorber 3 compresses by the length of the stroke H, the quantity of fluid F·H is displaced in the direction toward the work chamber 6 via the check valve 23. Since this chamber can receive only half that quantity, however, the other half, (F·H)/2 must flow via the control valve 17. During the relaxation stroke, the work chamber 5 draws in what it needs via the check valve 25, and the quantity (F·H)/2 again flows out via the control valve 17. In other words, the same quantity of fluid travels via the control valve 17 in both shock absorber stroke directions.

With the single control valve 17, both the spring firmness and the shock absorber firmness are varied; the latter is switched back and forth between two previously adjusted shock absorption values, in such a manner that preferably the greater shock absorber firmness is associated with the lesser spring firmness.

The differential pressure sensor 22 assures that a switchover takes place only if there is a pressure imbalance. The switchover level is different for various operating states.

In the event that a coupling between a plurality of shock absorbers 3 or shock absorber legs of a vehicle is allowable, and it is also allowable for the spring firmness of these elements to be switched over simultaneously, a further cost reduction is possible by providing that there be only one of each of the two reservoirs 15 and 15', the control valve 17 and the differential pressure sensor 22 in the overall apparatus. The remaining shock absorbers or shock absorber legs are connected to the same point of the line 13 as the pump 16. Then each shock absorber or leg should be provided with fixed-adjustment damping throttles, and only function of the control valve 17 would then be to switch the reservoir 15' into and out of action.

Figure 3:
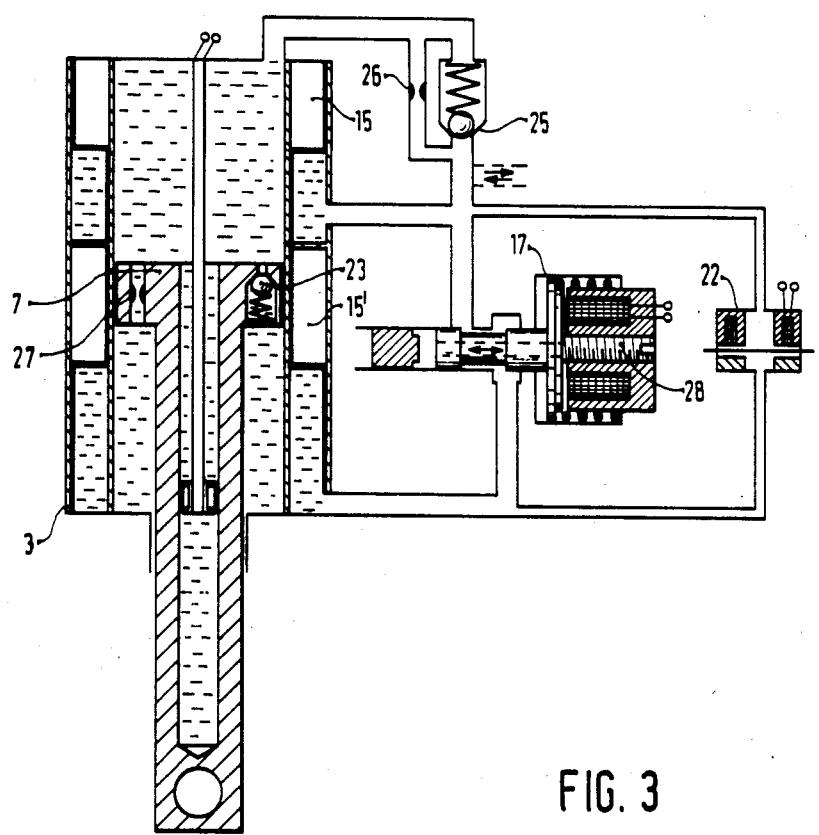
FIG. 3 is a further development of the structure of FIG. 2, having reservoirs integrated into the "shock absorber" and two fixed damping throttles for inflow and return flow, respectively.

FIG. 3 shows that it is also possible to provide the two reservoirs 15 and 15' of the embodiment of FIG. 2 coaxially to the axis of the shock absorber 3. The reservoir partitioning diaphragms are realized as roller diaphragms and the air chambers are each located above the respective fluid chambers. An addition to the structure of FIG. 2 is that here two fixed-adjustment damping throttles 26 and 27 are used; otherwise, corresponding elements have the same reference numerals as in FIG. 1.

The check valve 25 is seated at the same point as in FIG. 2; the check valve 23, contrarily, is inserted into the shock absorber piston. The control valve 17 additionally has an adjusting screw 28, with which the shock absorption is variable when the control valve 17 is open, for instance in order to increase shock absorption when the spring firmness is low.

Otherwise the mode of operation of this embodiment corresponds substantially to that of FIG. 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for controlling a spring-type firmness of a road vehicle, comprising a hydraulic load bearing element, a hydraulic control slide valve having a damping cross section of selectable size, said hydraulic control valve arranged to simultaneously monitor a connection between two work chambers of said hydraulic load bearing element and first and second hydropneumatic reservoirs, said hydraulic load bearing element being capable of being expanded into a hydropneumatic spring including said first and second hydropneumatic reservoirs and switching means for selectively switching said control valve to switch fluid from said second hydropneumatic reservoir into or out of action relative to said first reservoir and said hydraulic load bearing element.

2. An apparatus as defined by claim 1, further wherein said control valve is a magnetic valve.

3. An apparatus as defined by claim 2, further wherein said control valve is a continuously operating valve.

4. An apparatus as defined by claim 2, further wherein said control valve is arranged to receive input trigger signals from an electronic device, the input signals of which are generatable by means of sensor means for suspension, acceleration, vehicle speed or the like, disposed on said vehicle.

5. An apparatus as defined by claim 2, further wherein a differential pressure sensor connected between said two reservoirs is disposed parallel to said control valve.

6. An apparatus as defined by claim 2, further wherein said reservoirs are disposed coaxially around said load bearing element.

7. An apparatus as defined by claim 1, further wherein said control valve is a continuously operating valve.

8. An apparatus as defined by claim 1, further wherein a differential pressure sensor connected between said two reservoirs is disposed parallel to said control valve.

9. An apparatus as defined by claim 8, further wherein said sensor from said differential pressure signal is also an input signal for said electronic device.

10. An apparatus as defined by claim 1, further wherein said reservoirs are disposed coaxially around said load bearing element.

11. An apparatus for controlling a spring-type firmness of a road vehicle, comprising a hydraulic load bearing element, a hydraulic control slide valve comprising a continuously functioning throttle arranged to simultaneously monitor a connection between two work chambers of said hydraulic load bearing element and first and second hydropneumatic reservoirs, said hydraulic load bearing element being capable of being expanded into a hydropneumatic spring including said first and second hydropneumatic reservoirs, and switching means for selectively switching said control valve to switch fluid from said second hydropneumatic reservoir into or out of action relative to said hydraulic load bearing element by coupling said second reservoir to said first reservoir via said throttle of said control valve.

12. An apparatus as defined by claim 11, further wherein a differential pressure sensor connected between said two reservoirs is disposed parallel to said control valve.

13. An apparatus as defined by claim 11, further wherein said reservoirs are disposed coaxially around said load bearing element.

14. An apparatus as defined by claim 11, further wherein said control valve is a magnetic valve. also an input signal for said electronic device.

15. An apparatus as defined by claim 14, further wherein said control valve is arranged to receive input trigger signals from an electronic device, the input signals of which are generatable by means of sensor means for suspension, acceleration, vehicle speed or the like, disposed on said vehicle.

* * * * *